United States Patent [19]
Genzel et al.

[11] 3,868,185
[45] Feb. 25, 1975

[54] ASYMMETRIC MICHELSON INTERFEROMETER FOR SOLID STATE INFRA-RED SPECTROSCOPY

[75] Inventors: Ludwig Genzel, Freiburg; Jürgen Gast, Lahr, both of Germany

[73] Assignee: Max-Planck-Gesellschaft zur Forderung der Wissenshaften e.V., Gottingen, Germany

[22] Filed: Oct. 18, 1973

[21] Appl. No.: 407,503

[30] Foreign Application Priority Data
Oct. 18, 1972 Germany.......................... 2251080

[52] U.S. Cl.............. 356/106 R, 250/339, 356/109, 356/113
[51] Int. Cl. .......................................... G01b 9/02
[58] Field of Search.......... 356/106 R, 84, 109, 113, 356/107, 112; 250/339, 340, 341

[56] References Cited
UNITED STATES PATENTS
2,571,937  10/1951  Peck .............................. 356/106 R
3,776,636  12/1973  Dandliker et al................. 356/113

*Primary Examiner*—Harold A. Dixon
*Attorney, Agent, or Firm*—Brisebois & Kruger

[57] ABSTRACT

An asymmetric Michelson interferometer for infra-red solid state spectroscopy includes two concave mirrors of short focal length positioned in reference and sample beam paths leading respectively from a beam splitter to a retro-reflector and sample holder located close together in a low-temperature sample chamber at the focal points of the respective concave mirrors. The reference and sample beams have a "folded" geometry afforded by respective right angled mirrors, corner-cube reflectors or the like.

8 Claims, 5 Drawing Figures

BEAM SPLITTER

ASYMMETRIC MICHELSON INTERFEROMETER FOR SOLID STATE INFRA-RED SPECTROSCOPY

BACKGROUND OF THE INVENTION

This invention relates to asymmetric Michelson interferometers, particularly for solid state infra-red spectroscopy.

It is known to determine the complex index of refraction $e = (n + ik)^2$ and thereby the optical properties of a solid body by solid state spectroscopy. Since powerful computers have become available, so-called Fourier spectrometry has increasingly gained in importance. Asymmetric Michelson interferometers are particularly suited for carrying out such examinations (Infrared Physics, 1966, 6, 75–84 and 1969, 9, 185–209).

An asymmetric Michelson interferometer for solid state spectroscopy in the middle and far infrared should meet the following requirements:

1. It should be possible to examine small solid body samples (0.5 cm$^2$). The sample must, therefore, be in a beam focus the diameter of which is as small as possible, and the aberrations of the optical arrangement producing the beam focus have to be as small as possible in order not to influence adversely the interference capability of the beams.

2. No displacements of the focus at the point of the sample and at the end mirror should occur for the reference beam in the necessary change of the path difference in the interferometer between the reference beam path and the sample beam path in the two interferometer arms.

3. It should be possible to examine the sample not only at room temperature but also at low and high temperatures. Here, particularly, measurement at liquid helium temperature, that is of the order of magnitude of 4°K, is of particular significance.

4. The measurement beam coming from the radiation source should fall as normally as possible on the beam splitter in order to keep the self-polarization in the interferometer small. This is particularly important when a beam splitter having a very high efficiency such as one consisting of a metal mesh is used. (See e.g. Infrared Physics 1964, 4, 257–262).

5. The maximum value of the path difference between the sample beam path and the reference beam path and thus the spectral resolution of the instrument should not be smaller than is the case with good conventional symmetric Fourier interferometers. The interferometer should still include the entire middle and far infrared, that is the spectral sector of about 10 m to 1,000 m. None of the known asymmetrical Michelson interferometers fulfils all the above requirements in a satisfactory manner. In the Michelson interferometer known from the first publication cited above, for example, the important requirements (2) and (3) are not fulfilled, since the alteration of the path difference is effected by displacement of the end mirror in the reference beam path and the sample and the reference mirror are widely separated from each other. The requirement (1) is also only fulfilled inadequately, since the focus at the point of the sample is produced by means of a concave mirror which is disposed at a comparatively large distance from the sample, that is between the beam splitter and the light source.

The present invention therefore has the object of providing an asymmetric Michelson interferometer, which is suitable for solid body spectrometry in the middle and far infrared and meets all the above requirements.

A further object of the present invention is to provide a Michelson interferometer which permits the examination of small solid state samples.

SUMMARY OF THE INVENTION

The present invention provides an asymmetric Michelson interferometer comprising: a radiation source for producing a measurement beam; a beam splitter on which said measurement beam is arranged to fall to be divided into a sample beam and a reference beam; a sample holder for holding a sample from which said sample beam is reflected back to said beam splitter; an end mirror from which said reference beam is reflected back to said beam splitter; an adjustment arrangement for varying the optical length of the reference beam path relative to that of the sample beam path; at least two concave mirrors of short focal length, each disposed in said reference beam path and said sample beam path respectively, and where said sample holder and said end mirror are close to one another and disposed at the focal points of each of said concave mirrors; at least two reflector arrangements disposed between said beam splitter and said concave mirrors, for reflecting the reference and sample beams parallel but laterally transposed and wherein said adjustment arrangement is capable of displacing at least one of said two reflectors in a direction parallel to said parallel beams.

Since the sample is disposed in the focal plane of a concave mirror having a small focal distance the interferometer according to the invention permits the examination of small solid body samples. The aberrations of the concave mirrors are kept low by a modifification of the invention whereby the reflecting surfaces of the concave mirrors preferably have the form of extra-axial paraboloids.

Since the necessary change of the path difference between the sample and reference beam paths is produced by displacement of a right-angled mirror, preferably a central mirror (triple mirror or corner cube reflector) in the parallel beam path, no displacements in the focus at the point of the sample or of the end mirror occur for the reference beam.

In the present Michelson interferometer the sample and the end mirror for the reference beam can be accommodated close to one another in a sample chamber or cryostat chamber. When the radiation enters or leaves the chamber by way of a radiation transmitting window, such an arrangement assures that the window is penetrated by the sample beam and the reference beam at nearly the same area and path differences between the two partial bundles are avoided. Preferably the beam paths cross one another between the concave mirror and the sample or the end mirror at the point of the window, since then both beams penetrate the same region of the window.

With the present Michelson interferometer the entire middle and far infrared can be scanned in spite of a minimal space requirement, since a displacement of a triple mirror or right-angled mirror through a predetermined distance produces a path difference of double that amount.

BRIEF DESCRIPTION OF THE DRAWINGS

The inventive concept as well as modifications and developments of the invention will be more closely explained on the basis of embodiments with reference to the drawings in which.

DETAILED DESCRIPTION OF THE ILLUSTRATED EMBODIMENTS

Figure 1:
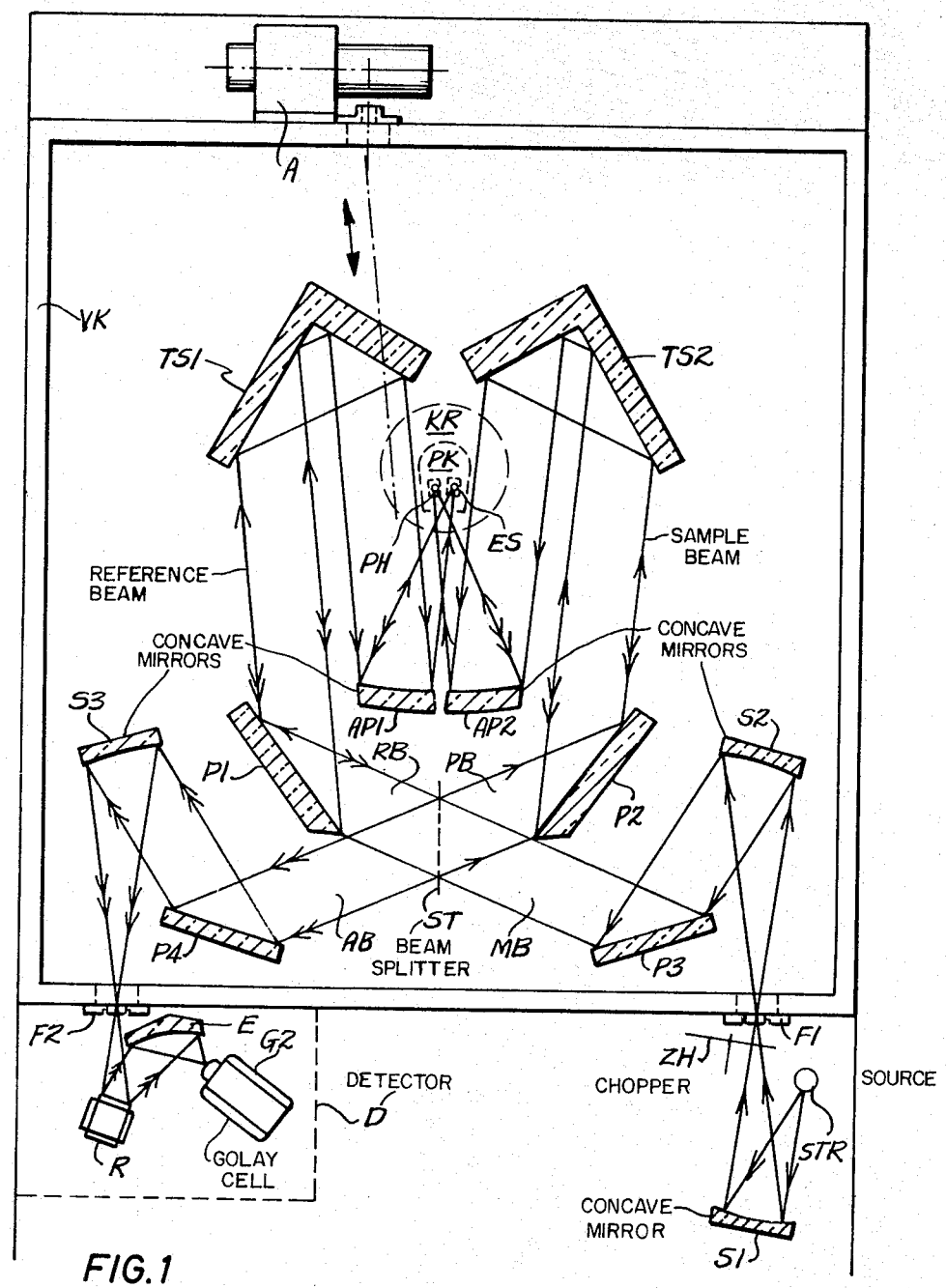
FIG. 1 shows a simplified plan of an asymmetric Michelson interferometer according to a first embodiment of the invention.

The embodiment of the invention shown schematically in FIG. 1 is intended for measurements in the middle or far infra-red. The essential parts of the beam paths are accommodated in known manner in a chamber VK which can be evacuated.

The measurement radiation used for the examination is generated by a radiator STR (e.g., a high pressure mercury lamp). The radiation beam emerging from the radiator STR is focussed by a spherical concave mirror S1 on an entry window F1 in the wall of the vacuum chamber VK. The entry window F1 can contain a filter or can consist of a filter. The measurement beam which diverges into the interior of the vacuum chamber VK from the entry window F1 falls on a second spherical concave mirror S2, from which it is reflected as a parallel beam to a plane mirror P3. From the plane mirror P3 the parallel measurement beam MB falls on a beam splitter ST, which is formed in known manner and which may, for example, contain a foil of synthetic material or a metal wire mesh. The measurement beam MB should form as small an angle as possible with the normal to the plane of the beam splitter ST, for example 15° and 25°.

From the beam splitter ST the measurement beam is split into a reflected partial beam and a transmitted partial beam, which serve as sample beam PB and reference beam RB respectively.

The reference beam RB traverses a reference beam path which extends between the beam splitter ST and an end mirror ES and back again, the reference beam path beginning from the beam splitter ST and containing essentially a plane mirror P1, a right-angled mirror TS1 and a concave mirror AP1.

The sample beam PB traverses a sample beam path which is essentially symmetrical with the reference beam path, and the sample beam contains essentially a second right-angled mirror TS2 and a second concave mirror AP2.

The concave mirrors AP1 and AP2 preferably have mirror surfaces in the form of asymmetrical paraboloids, so that the aberrations are as small as possible.

The concave mirrors AP1 and AP2 are so arranged that they focus the incident parallel beam at the point of the end mirror ES or at a sample arranged in a sample holder PH.

The sample holder PH and the end mirror ES are accommodated close to each other in a sample chamber PK, which in the present embodiment can be cooled by means of a cryostat KR to the temperature of liquid helium.

The arrangement of the concave mirrors AP1 and AP2 is such that the reference beam and the sample beam cross at the point of an entrance window, not shown, of the sample chamber, so that both beams cover practically the same region of the window.

The reference beam and the sample beam are reflected respectively by the end mirror ES and by the sample which is located in the sample holder PH and return to the beam splitter ST by way of the concave mirrors AP1 and AP2, the right-angled mirrors TS1 and TS2, and the plane mirrors P1 and P2, the returning beam paths being indicated by double-headed arrows. The beam splitter ST reflects or transmits a part of the returning beams, and by this means produces an exit beam AB consisting of the reflected part of the reference beam and the transmitted part of the sample beam. The exit beam AB is reflected by a plane mirror P4 to a spherical concave mirror S3, which reflects the exit beam AB by way of an exit window F2 to a detector arrangement D which in the present example, comprises a reflection filter R, a concave mirror E, the reflecting surface of which has the form of an extra-axial ellipsoid, and a Golay cell.

In the path of the measurement beam, for example, between the spherical concave mirror S1 and the entry window F1, there is disposed a conventional beam chopper ZH.

The right-angled mirror TS1 is measurably displaceable parallel to the axis of the incident reference beam by means of an adjustment arrangement indicated only schematically and which comprises a drive motor A.

Figure 2:
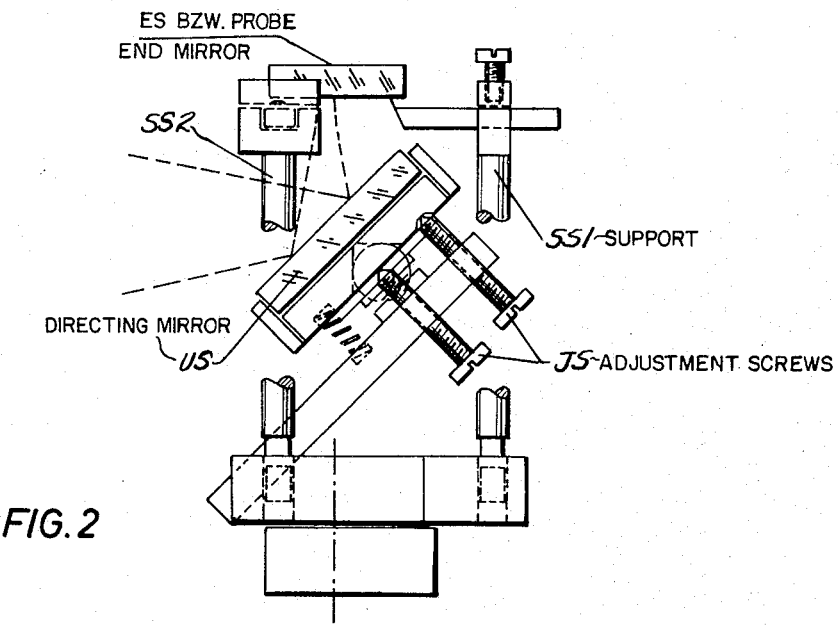
FIG. 2 is a partial sectional elevation of a sample or end mirror holder.

FIG. 2 shows an embodiment of a holder arrangement for the end mirror ES and the sample respectively. The holder contains a plane directing mirror US which diverts the substantially horizontally incident convergent beam coming from the concave mirror AP1 or AP2 upwards at right angles. The end mirror ES, or the sample, are held on three adjustable supports, of which only two supports SS1 and SS2 are visible in FIG. 2.

The directing mirror US which makes an angle of 45° with the central axis of the incident beam is adjustable by means of two adjustment screws JS.

During adjustment of the interferometer mirrors are placed in both holders. After adjustment, one of the mirrors is replaced by a sample, which should have a surface which is ground as plane as possible, and which must not become deformed during measurement.

Figure 3:
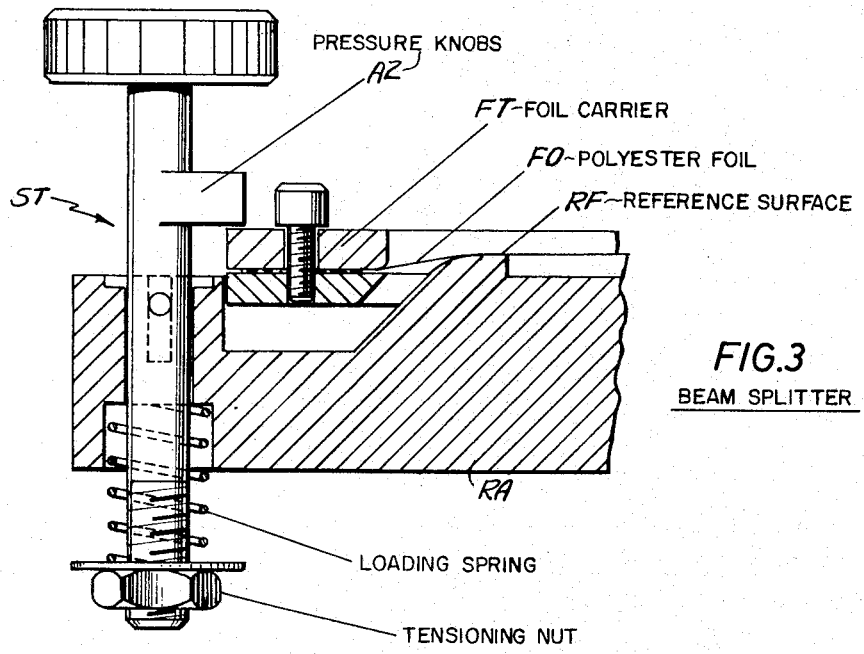
FIG. 3 is a partial view of a beam splitter.

FIG. 3 shows a partial view of a practical embodiment of the beam splitter ST. The active element of the beam splitter here consists of a polyester foil FO which is stretched by means of a foil carrier FT over a frame RA, which has a reference surface RF. The foils are rapidly exchangeable by the simple release of three spring-loaded pressure knobs AZ, whereby it is guaranteed that during replacement of the beam splitter foil, no maladjustment takes place. By means of sets of springs having different strengths and with the help of the tensioning screws the pressure of the knob on the foil carrier can be so adjusted that beam splitter foils of different materials and different thickness can be stretched optimally on the reference surface.

Figure 4:
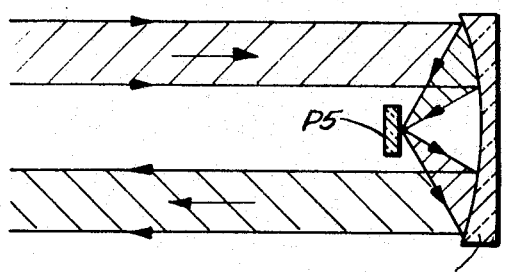
FIG. 4 is a schematic representation of a so-called "cat's-eye"

Instead of the right-angled mirrors TS1 and TS2 other reflector arrangements can, of course, be used which reflect an incident beam transposed in a parallel direction. For example, a triple right-angled mirror or "corner cube" reflector may be used, which contains three reflecting surfaces mutually at right angles to each other. FIG. 4 shows a third alternative, which is known as a "cat's-eye." The reflector arrangement according to FIG. 4 comprises a concave mirror HO which may exhibit a spherical or parabolic mirror surface. In the focus of the mirror HO there is arranged a small plane mirror P5. An incident beam will, as shown, be reflected parallel and transposed by means of such a reflector arrangement.

Figure 5:
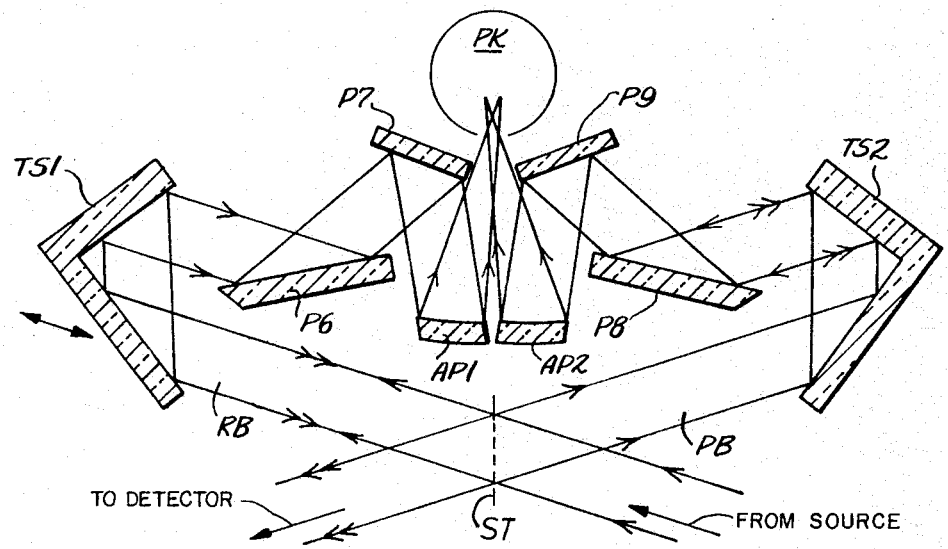
FIG. 5 is a schematic partial view of a second embodiment of an asymmetric Michelson interferometer according to the invention.

FIG. 5 shows a further embodiment of an asymmetric Michelson interferometer according to the invention. Component parts having the same function are designated by the same numerals in FIGS. 1 and 5.

The reference beam RB and the sample beam PB in the embodiment of FIG. 5 fall from the beam splitter ST directly on to the right-angled mirrors TS1 and TS2 and are then reflected by two mirrors P6 and P7, and P8 and P9 respectively, which are arranged in the manner shown, on to the concave mirrors AP1 and AP2. In other respects the construction can correspond to that of the embodiment according to FIG. 1.

The embodiments which have been described are intended for the examination of reflecting samples. An alteration for the examination of transmission is easily possible, for example, two end mirrors can be used and the sample can be disposed between one of the directing mirrors US and one of the end mirrors ES (FIG. 2).

The embodiments described may, of course, be modified in other respects. For example, it is possible to allow the diverging beam to fall from the entry window directly on to the beam splitter and to use instead of the plane mirror P1 a concave mirror of appropriate focal length, which will convert the incident diverging beam into a parallel beam. A corresponding concave mirror would then take the place of the mirror P2.

We claim:
1. An asymmetric Michelson interferometer comprising:
   a radiation source for producing measurement beam;
   a beam splitter on which said measurement beam is arranged to fall to be divided into a sample beam and a reference beam;
   a sample holder for holding a sample from which said sample beam is reflected back to said beam splitter;
   an end mirror from which said reference beam is reflected back to said beam splitter;
   an adjustment arrangement for varying the optical length of the reference beam path relative to that of the sample beam path;
   at least two concave mirrors of short focal length, each disposed in said reference beam path and said sample beam path respectively, and where said sample holder and said end mirror are close to one another and disposed at the focal points of each of said concave mirrors;
   at least two reflector arrangements disposed between said beam splitter and said concave mirrors, for reflecting the reference and sample beams parallel but laterally transposed and wherein said adjustment arrangement is capable of displacing at least one of said two reflectors in a direction parallel to said parallel beams.

2. An asymmetric Michelson interferometer according to claim 1, wherein the concave mirrors are disposed next to one another and comprise mirror surfaces in the form of extra-axial paraboloids.

3. An asymmetric Michelson interferometer according to claim 2, wherein the reflector arrangements each comprise a right-angle mirror, a triple or corner-cube mirror, or a "cat's-eye."

4. An asymmetric Michelson interferometer according to claim 3, wherein the reference beam path and the sample beam path cross one another between the concave mirrors and their corresponding foci.

5. An asymmetric Michelson interferometer according to claim 4, wherein the sample holder and the end mirror are disposed in a closed sample chamber comprising a window which is transparent to the measurement radiation and which is situated in the crossover region of the beams.

6. An asymmetric Michelson interferometer according to claim 1, wherein a reflecting element is arranged in each of the reference and sample beam paths between the beam splitter and each concave mirror, said reflecting element reflecting in approximately parallel directions the beams diverging from the beam splitter at a wide angle, and wherein the reflector arrangements are disposed in the paths of these reflected beams behind the sample holder as well as behind the end mirror, as seen from the beam splitter, and that the concave mirrors are disposed in the space between the beam splitter and the sample holder and end mirror.

7. An asymmetric Michelson interferometer according to claim 1, wherein the reference and sample beams which diverge from the beam splitter at a wide angle, first fall on the reflection arrangements and then are each thrown on the concave mirrors over a reflecting arrangement, said concave mirrors being disposed next to one another between the beam splitter and the sample holder and the end mirror.

8. An asymmetric Michelson interferometer according to claim 1, wherein a directing mirror is disposed between the concave mirrors and the end mirror and the sample respectively, to divert the relevant beams 90°, and that an adjustable three-point support is provided for holding the sample and the end mirror respectively.

* * * * *

UNITED STATES PATENT OFFICE
CERTIFICATE OF CORRECTION

PATENT NO. : 3,868,185
DATED : February 25, 1975
INVENTOR(S) : LUDWIG GENZEL and JURGEN GAST It is certified that error appears in the above-identified patent and that said Letters Patent are hereby corrected as shown below:

[30] Foreign Application Priority Data

October 18, 1972   Germany ............P.22 51 080.1

Signed and Sealed this twenty-eight Day of October 1975

[SEAL]

Attest:

RUTH C. MASON
*Attesting Officer*

C. MARSHALL DANN
*Commissioner of Patents and Trademarks*